United States Patent [19]

Berend

[11] 4,251,574
[45] Feb. 17, 1981

[54] METHOD OF MOLDING GLOVES

[75] Inventor: Francis T. Berend, Boulogne-sur-Seine, France

[73] Assignee: Societe Anonyme Parinter, France

[21] Appl. No.: 844,404

[22] Filed: Oct. 21, 1977

[30] Foreign Application Priority Data

Oct. 22, 1976 [FR] France ................. 76 31871

[51] Int. Cl.³ ............... B05D 1/32; B05C 13/02
[52] U.S. Cl. .................... 427/282; 118/504; 264/129; 264/257; 264/259; 264/264; 425/93; 425/269; 425/275; 427/288; 427/300
[58] Field of Search ............ 427/300, 282, 288, 259; 118/504; 264/259, 129, 264, 301, 305, 308, 213–215, 306; 425/90, 93, 269, 270, 275; 2/159, 161 R, 167, 168, 169; 269/43, 46

[56] References Cited

U.S. PATENT DOCUMENTS

| 226,459 | 4/1880 | Sackett | 427/300 |
| 493,027 | 3/1893 | Hoggson | 427/300 |
| 1,725,065 | 8/1929 | Edwards | 2/168 |
| 1,955,131 | 4/1934 | Kirschbraun | 427/300 |
| 2,060,961 | 11/1936 | Tillotson | 427/288 |
| 2,849,331 | 8/1958 | Turbolente | 427/259 |

FOREIGN PATENT DOCUMENTS

| 5107 of 1878 | United Kingdom | 427/300 |
| 868411 | 5/1961 | United Kingdom | 427/300 |

Primary Examiner—W. E. Hoag
Attorney, Agent, or Firm—Robert E. Burns; Emmanuel J. Lobato; Bruce L. Adams

[57] ABSTRACT

In the manufacture of a protective glove, there is provided a mold having two parts interconnected to be moved into open and closed positions. There is also provided an inner glove lining, and each part of the mold is covered with it. The mold, in closed position, is dipped in a bath of protective coating material, removed therefrom, and exposed to initial draining of an excess of coating material. Thereafter, the mold is opened and the draining is completed, while portions of the coating material are retained and gelled.

6 Claims, 3 Drawing Figures

METHOD OF MOLDING GLOVES

BACKGROUND OF THE INVENTION

The invention relates firstly to a method for the manufacture of a protective glove of the type comprising an area devoid of protective coating, in particular the back. A manufacturing mold makes it possible to carry out the method, and a glove is obtained from the mold by carrying out the method.

Protective gloves are already known, which are intended particularly for handling industrial castings and protecting the user's hands against chemical products, which gloves have an inner lining of flexible fabric, for example interlock, covered externally by a protective coating of plastics material. According to requirements, the inner lining is completely or only partly devoid of protective coating. In particular, the glove may have a "ventilated back".

The protective coating has been produced hitherto, by exposing a glove mold, covered with an adequate inner lining, in at least one bath of an appropriate mixture of polyvinyl chloride resin and plasticizer, followed by draining and pregelling or gelling.

When the coating completely covers the lining, vertical soaking or dipping of the mold in the bath is generally carried out. When the coating covers only part of the lining, in particular covering only part of the back, and one must resort instead to flat dipping in which an area of the glove, in particular the back, emerges permanently from the bath of polyvinyl chloride resin and plasticizer, in which the remainder of the glove is dipped. However, this causes the drawback of producing borders at the edge of the dipped or soaked area, which borders vary from one glove to another such that production is no longer regular and uniform.

SUMMARY OF THE INVENTION

In order to obviate these drawbacks, the invention proposes a method for the manufacture of a protective glove comprising a lining covered externally by a protective coating, in particular of plastics material, comprising at least one protective layer covering only part of the lining, for example with the exception of all or part of the back, characterised by the fact that one uses a mold in two parts each constituting a glove shape, which parts are able to move one with respect to the other and to be moved away from each other or, on the contrary, towards each other, while being attached in a common area. Each of these parts is provided with an adequate inner glove lining and with the mold closed, vertical dipping of the mold covered by linings takes place in a bath of protective coating material such that the area common to the two parts of the mold is not covered with coating material, the mold is then removed from the bath and drainage of the protective coating material begins with the mold still closed, the mold is opened and the end of drainage and gelling of the coating material take place with the mold open.

The invention thus uses a mold for carrying out the method, which is constituted by two parts moving one with respect to the other constituting a shape for the manufacture of gloves and being able to be moved away from each other or, on the contrary, towards each other while being partly attached, in particular in the area of the back of the glove.

Naturally, the method of manufacture and the mold may be used in the open state to produce a coating completely covering the glove.

Implementation of the method has numerous advantages: the border of the area which is not covered is perfectly regular and uniform for all gloves produced. It is possible to use the same production lines as those used hitherto. It is possible to include in the non-covered area, the beginning of the phalanges of the four fingers opposite the thumb which gives the glove greater elasticity and flexibility, which is impossible with flat dipping.

BRIEF DESCRIPTION OF THE DRAWINGS

The invention will be better understood by means of the ensuing description referring to the accompanying drawings in which.

DESCRIPTION OF THE PREFERRED EMBODIMENT

The protective glove manufactured by the method according to the invention comprises a flexible inner lining 1 of fabric, for example of interlock, covered externally by a protective coating of plastics material which comprises at least one layer 2 covering the glove only partly, for various reasons, for example owing to the fact that this layer has only limited elasticity and flexibility, or for any other reason. More precisely, the layer 2 does not cover the major part of the back 3 and the wrist 4 of the glove having a so-called "ventilated back".

Figure 3:
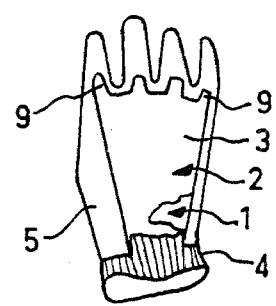
FIG. 3 is a diagrammatic elevational view, with parts cut away, seen from the back of a glove produced according to the present invention.

Optionally, depending on the desired qualities of mechanical and physical strength and chemical resistance, the protective coating may comprise at least one other layer 5 covering the lining 1 completely, the layer 2 covering the layer 5 only partly (FIG. 3).

Figures 1, 2:
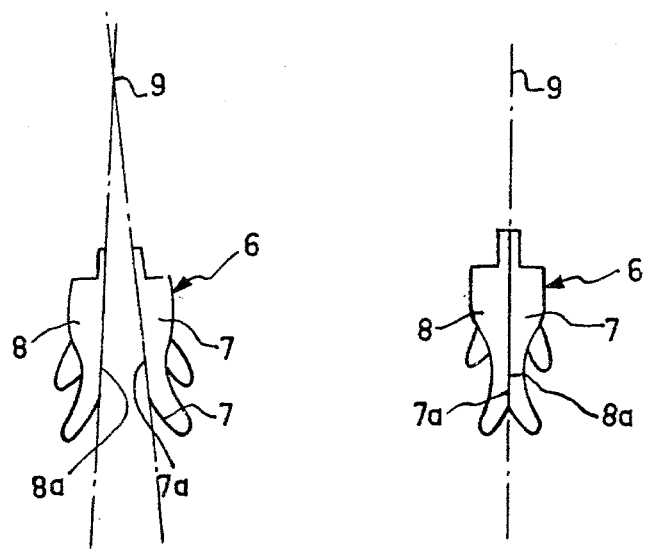
FIG. 1 is a diagrammatic profile view of the mold used according to the present invention, in the closed position.
FIG. 2 is a diagrammatic profile view of the mold according to FIG. 1, in the open position.

To carry out the method, one uses a mold 6 (FIGS. 1 and 2) comprising two parts each constituting a glove shape known per se, 7, 8 respectively arranged in pairs and placed one with respect to the other in two possible positions: the first illustrated in FIG. 2 where the mold 6 is open and the two parts 7, 8 are moved apart; the second position, illustrated in FIG. 1, where the mold 6 is closed and the two connected parts 7, 8 are in contact in the areas 7a, 8a.

In a preferred embodiment, the areas 7a and 8a correspond to the back of each of the shapes 7, 8.

Coupling of the two parts 7, 8 enabling the mold to be either open or closed is achieved by any appropriate means. In particular, the two parts 7, 8 are pivoted to each other about a spindle 9 preferably located adjacent the wrist of each of the parts 7, 8, thus opposite the fingers. This arrangement makes it possible on the one hand for the fingers of the two shapes 7, 8 to be further apart than the wrists, and on the other hand to prevent the spindle 9 from being immersed in the bath of protective material.

According to the method of the invention, a lining is provided, which will constitute the lining 1 of the glove, and each of the two parts 7, 8 is covered with this lining.

To produce a layer 2 covering only part of the glove, in particular by leaving the back uncovered, one proceeds in the following manner: when the shapes 7, 8 are covered with their lining 1, the mold is dipped vertically in a bath of protective coating material, while the mold is in the closed state, which prevents the areas 7a and 8a from being covered with protective material. This is why, in the case of the manufacture of a glove having a "ventilated back", the areas 7a and 8a correspond to the back of each of the shapes 7, 8. Naturally, it is clear that the areas 7a and 8a must correspond to the contour which it is desired to obtain finally, as regards the layer 2.

After such dipping of the closed mold 6, the mold is removed from the bath and pre-draining is carried out thus allowing the major part of the excess protective material to be eliminated. This pre-draining is carried out with the mold closed in order to prevent any burr of protective material in the areas 7a and 8a. The mold 6 is then opened by moving the two shapes 7, 8 apart, which is made possible since the protective coating material has not yet hardened. With the mold still open (FIG. 2), final draining of the protective coating material is carried out in order to obtain a thickness of this material which is as uniform as possible. To this end, it is possible to invert the mold 6, the fingers of which were hitherto pointing downwards.

Finally, when draining has been completed and the mold 6 is still open, gelling of the layers of protective coating material thus produced takes place.

Subsequently, the lining 1 provided with its layer of protective coating 2 may be removed from the corresponding shape.

The shape and size of the area of lining devoid of protective coating depend on the size and shape of the area common to the two glove shapes 7, 8, when the mold 6 is closed. Consequently, it is possible to provide molds 6 whereof said common area has a shape and size predetermined as a function of the specific use of the glove. In particular, it is possible for the common area in question to have a shape such that the beginning of the phalanges 9 of the fingers of the glove opposite the thumb is devoid of protective coating, as illustrated in FIG. 3.

Naturally, it is clear that the invention may have numerous variations in particular as regards the means for moving the two glove shapes 7, 8 constituting the mold towards and away from each other.

The method, such as has been described, may also be applied to the production of a coating layer covering the glove completely. In this case, it is sufficient to carry out the dipping operation with the mold open.

I claim:

1. The method for dip-coating preformed fabric gloves, comprising: disposing said preformed fabric gloves upon mating glove forms, said forms having mutually contacting areas when two said forms, bare of gloves, are in closed position; closing said forms together so as to exclude subsequently applied coating material from portions of said gloves between said forms; dipping the closed forms with said gloves into a bath of hardenable coating material; removing the so-covered and coated, closed forms from the bath; initiating a draining of an excess of the protected coating material from the closed forms; opening the forms; and thereupon completing the draining, while retaining and gelling portions of said coating on the gloves.

2. The method for dip-coating preformed fabric gloves according to claim 1, in which said forms have the backs of the gloves in contact with each other when in a closed position thereby to preclude said hardenable coating material coating an area of each of the backs of said gloves.

3. The method for dip-coating preformed fabric gloves according to claim 2, in which said forms are constructed so that a principal area of the backs of said preformed gloves are in contact so that a principal area of the back of each of said gloves is not coated with hardenable material.

4. The method for dip-coating preformed fabric gloves according to claim 2, in which the forms are constructed to contact the backs of the gloves when in a closed position and to control the shape of said area of each of the backs of the gloves precluded from being coagted.

5. Forms for dip-coating protective gloves comprising:
two configured members having shapes similar to human hands, means for mounting said two members with prefabricated gloves thereon in mutual back-to-back contact, and said members being configured to exclude coating material from portions of said gloves in mutual contact.

6. Forms according to claim 5, wherein said forms are configured to exclude coating material from principal areas of backsides of said gloves mounted on said members.

* * * * *